Dec. 15, 1931.  J. C. SCHAFFER  1,836,510
TEMPERATURE TREATMENT
Filed Feb. 23, 1927  4 Sheets-Sheet 2
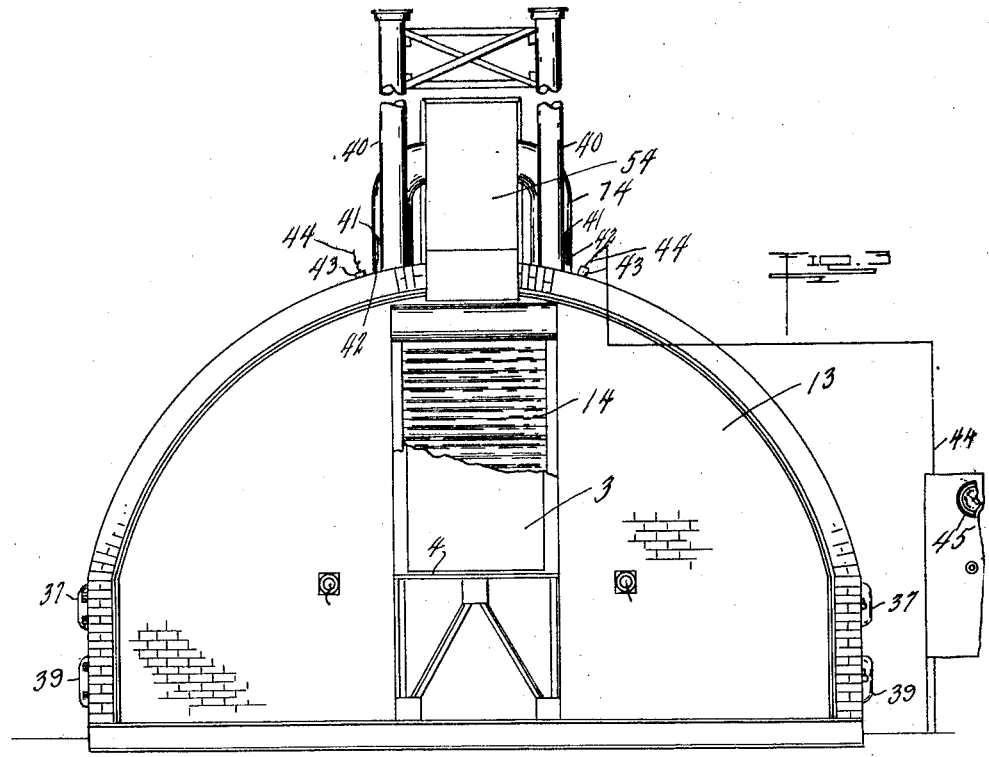
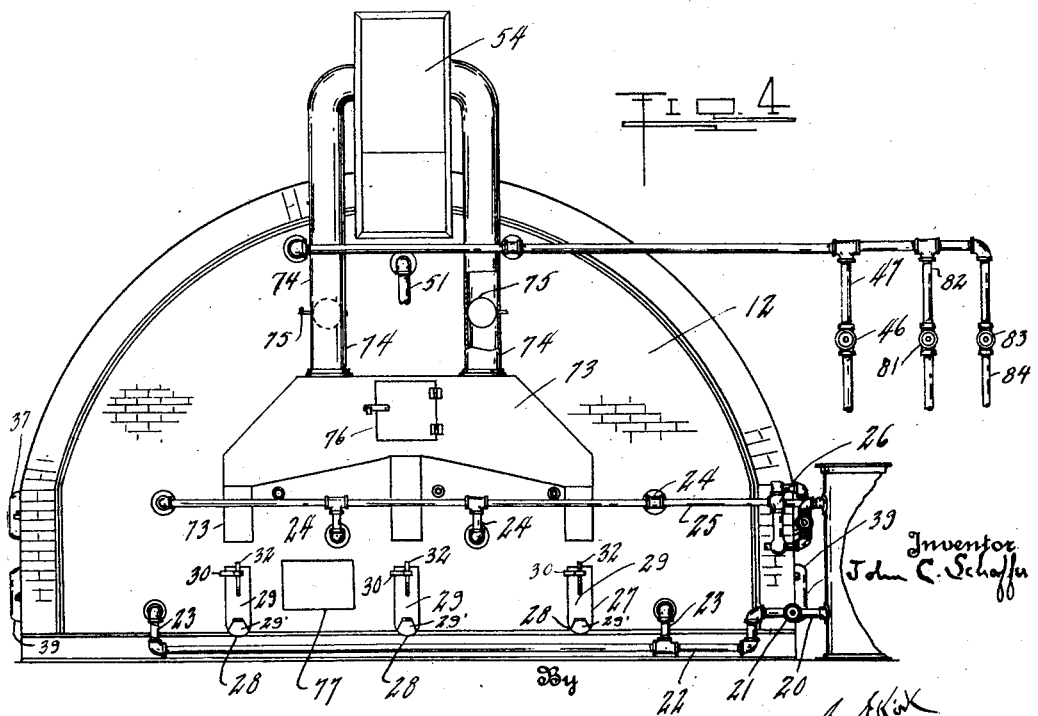

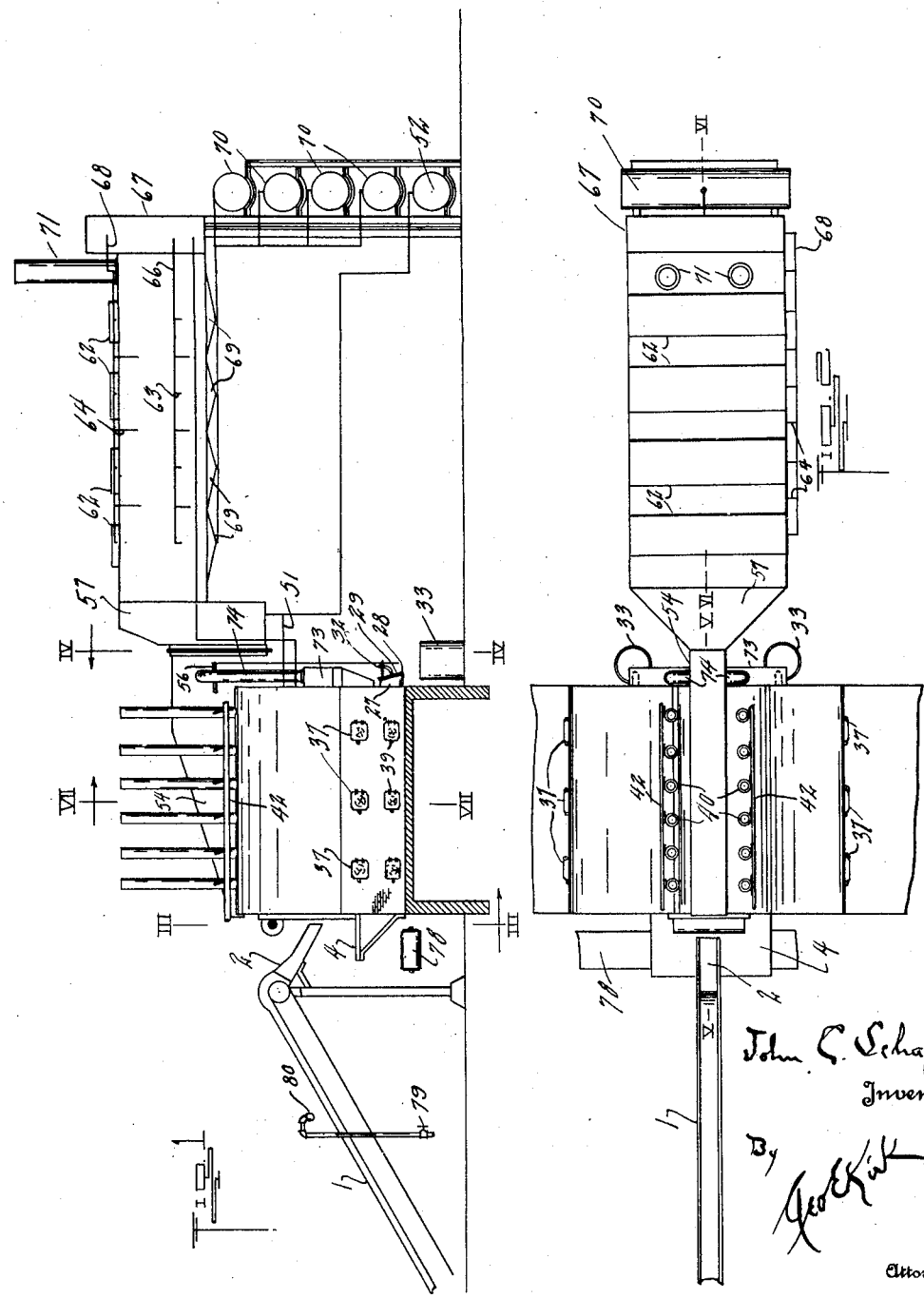

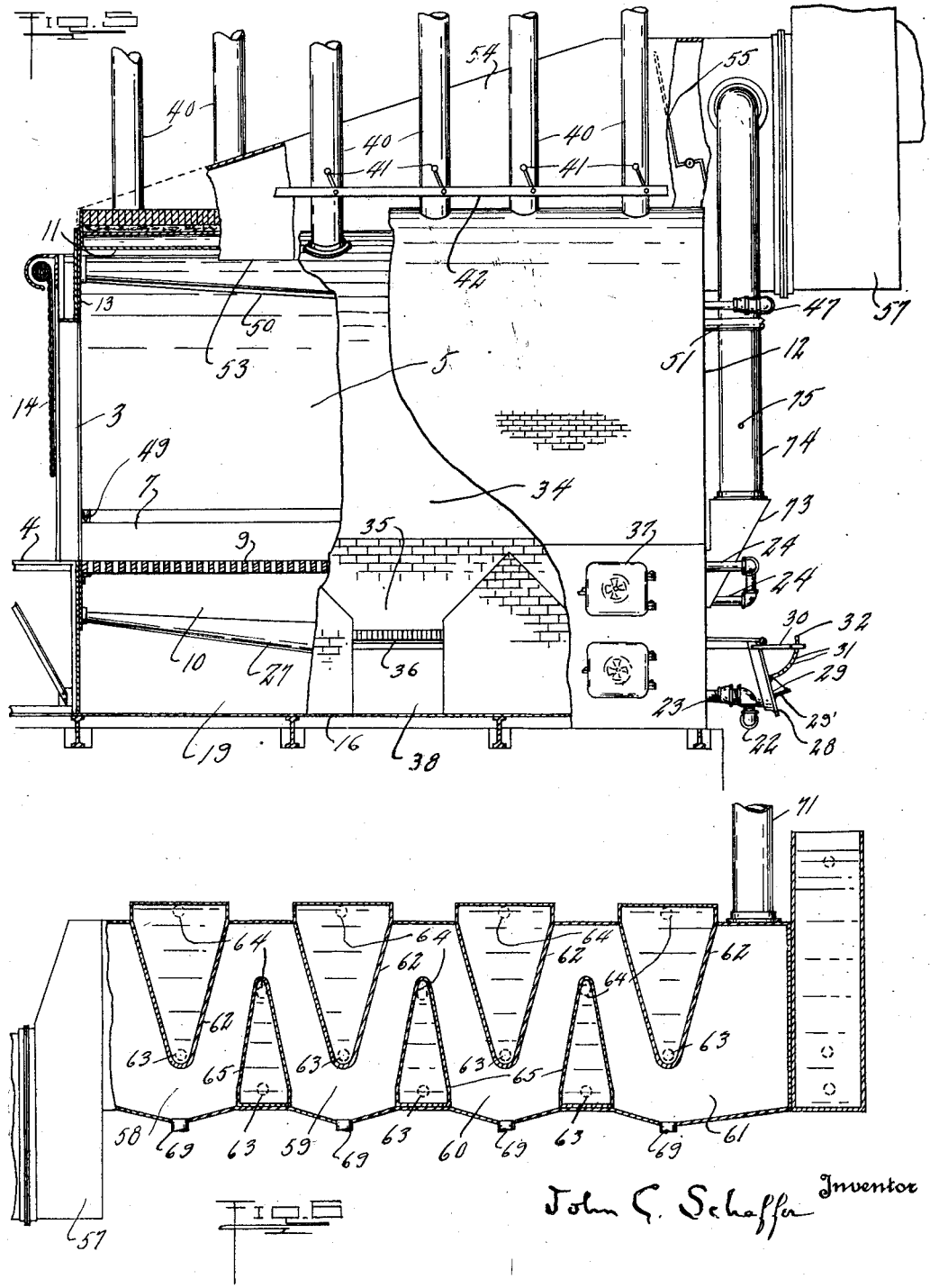

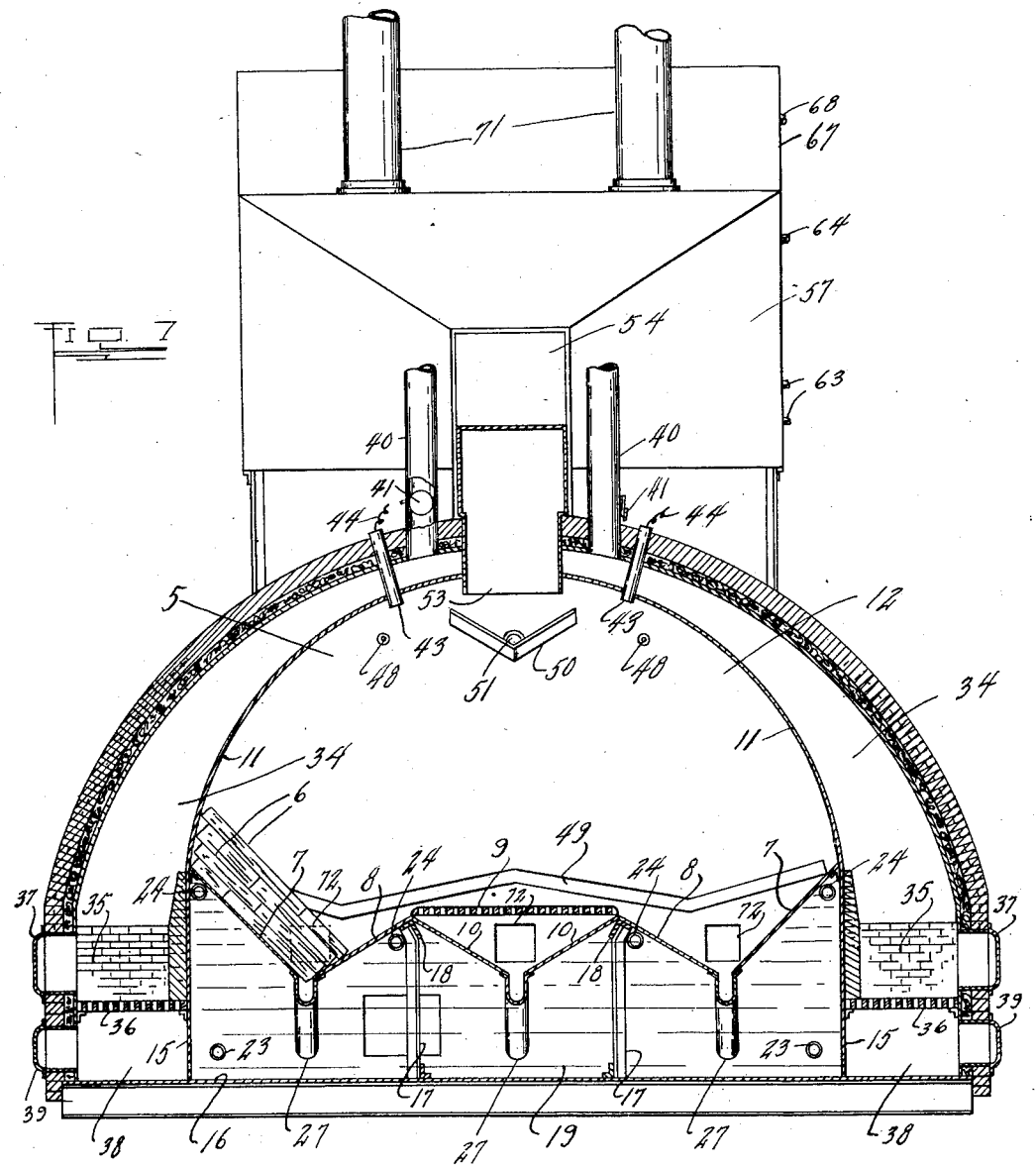

Patented Dec. 15, 1931

1,836,510

UNITED STATES PATENT OFFICE

JOHN C. SCHAFFER, OF PITTSBURGH, PENNSYLVANIA, ASSIGNOR, BY MESNE ASSIGNMENTS, TO AMERICAN PINE CHEMICALS, INC., OF NEW AUGUSTA, MISSISSIPPI, A CORPORATION OF DELAWARE

TEMPERATURE TREATMENT

Application filed February 23, 1927. Serial No. 170,402.

This invention relates to controlling heating and cooling of material for separating and classifying products.

This invention has utility in connection with the separation of liquids and volatiles from solids, more particularly in wood distillation.

Referring to the drawings:

Fig. 1 is a side elevation, with parts broken away, of an embodiment of the invention in a wood distillation plant;

Fig. 2 is a plan view of the apparatus of Fig. 1;

Fig. 3 is a view on the line III—III, Fig. 1, looking in the direction of the arrow;

Fig. 4 is a view on the line IV—IV, Fig. 1, looking in the direction of the arrow;

Fig. 5 is a partial section on the line V—V, Fig. 2;

Fig. 6 is a partial section on the line VI—VI, Fig. 2; and

Fig. 7 is a section on the line VII—VII, Fig. 1.

Elevator 1 may bring up pieces of wood to discharge by chute 2 through opening 3. Below this opening 3 is landing 4 from which workmen may have access to interior of chamber 5 there to distribute the fragments of wood by piling such pieces 6 on end assembly across trough sides 7, 8, as well as on grate or open work 9 above trough sides 10. This open work 9 primarily serves as a deck for the workmen who set up the wood in charging the retort or chamber. However, additionally this open work grate 9 provides sustaining means for the wood as stacked thereover, allowing such wood to have its exudations pass through the open work 9 to the trough below. These trough sides 7, 8, 10, form the bottom of this chamber 5 from which arching sides walls 11 extend upward in forming a semi-cylindrical or arch roof for this chamber having rear end 12 with front end 13 through which is the opening 3.

When this chamber 5 is charged with the material, closure 14 may be operated to close the opening 3. From the arch side walls 11 of this chamber 5 there depends leg portions 15 to base 16 from which rise legs 17 carrying supports 18 for the ridges between the trough sides 8, 10. There is thus formed below the bottom 7, 8, 10, of this chamber 5, a temperature controlling medium jacket 19. Cold water supply line 20 has valve 21 therein open to permit flow of water by line 22 to branch lines 23 extending into the lower portion of the chamber 19. From upper portions of this chamber 19 hot water take off lines 24 extend as branches of line 25 past temperature controlled regulator valve 26. In the operation hereunder when this chamber 19 is to be used as a water jacket and it is filled with water throughout instead of having such but partially filled for steam action against the troughs, this valve 26 may be set to open at a determined rise in temperature thus allowing spill of hot water and inflow of cold water from the line 20 to maintain a desired temperature condition for the multiple trough bottom of this chamber 5. The trough sides 7, 8, 10, as depending, merge into tapered troughs 27 extending parallel to each other from adjacent end 13 of chamber 5 to past and below the end 12 of the chamber 5, there to have discharge spouts 28 provided with hinged lids 29, the opening of which may be adjusted by bars 30 engaging openings 31 of arc bars 32 fixed with the respective lids 29. As these lids 29 have auxiliary lids 29' open, discharging of the collection from these troughs may be gathered in vessels 33.

The arch side walls 11 of this chamber 5 are provided with heat imparting jacket chambers 34 rising from fire pots 35 over grates 36 adjacent fire doors 37. Below these grates 36 are ash pits 38 access to which is gained by ash pit doors 39. By firing these furnaces as having combustion chambers 35, the chambers 34 serve as heat imparting means to the walls 11 of the chamber 5. The production of combustion from these furnaces as rising through these jacket chamber portions 34 pass by stacks 40 with the draft upward therefrom controlled by dampers 41 which may be simultaneously operated by bars 42 for the two batteries of these stacks 40. There may thus be a controlling rate of operation for these furnaces. Additionally a temperature check may be had upon the chamber 5 through pyrometers 43 having lines 44 therefrom extending to indicating instrument 45 which is conveniently located for the firemen as operating the furnaces.

In the event it is desired to check or otherwise control the temperature in the chamber 5, valve 46 in line 47 as a supply of air, steam or water for discharge by pipes 48 into the upper portion of the chamber 5.

In the heating operation of this chamber 5 there is no tendency for condensation or melting of the product on the arch walls 11. However, on the end walls 12, 13, there may be some condensation and the drippings from such are collected by minor troughs 49 with overflow from the shorter height inner sides (Figs. 5, 7) lower portions to the trough sides 10 for flow from thence into the major troughs 27. In the upper portion of the chamber 5 and extending from the wall 13 to incline downwardly is trough 50 having discharge outlet 51 which may extend to collection reservoir 52.

Above this trough 50 the chamber 5 has discharge to housing 54 open at the bottom as at 53 rising to increase its capacity from the wall 13 toward the wall 12, there to have damper 55 as operated by lever 56 shifted to open position to permit flow of vapors from this chamber 5 by passage 57 into series of zig zag or V-passage portions 58, 59, 60, 61. These V-passages are formed by water jacket chambers 62 depending therein having cool water supply lines 63 from the lower portions thereof and warm water discharge lines 64 from the upper portions thereof. Additionally in this housing between the V-sections of this zig zag passage are water jacket chambers 65 having lower cold water supply pipes 63 thereto and upper warm water discharge pipes 64 therefrom. These cold water supply pipes 63 are branches from supply pipe 66 extending from tank 67 to which tank 67 hot water supply line 68 brings back the warm water for maintained circulation in this temperature control for the zig zag passages 58, 59, 60, 61, which respectively have condensation accumulation take offs 69 from which lines may extend selectively to different reservoirs 70.

In the operation hereof to establish or control a draft through chamber 5 there may be a desired opening of the lids 29. This admission of circulation promoting medium passing through chamber 5 may result in non-condensable portions evolving from material being treated therein which may pass from the V-shaped passages 58 to 61 and escape by stack 71.

In the operation hereunder in the treatment of wood say for the production of rosin, the chamber 19 may be operated as a water jacket throughout and the heating jacket 34 operated to warm the vertically disposed sections of wood, to the end that the fibre of the wood as upwardly extending may have its upper portions warmed to melt down the gum portions for exuding longitudinally from the ends of the wood fibre to run on the trough sides 7, 8, 10, to pass from the troughs 27 into the receivers 33. Volatiles from this wood distillation entrain therefrom portions of the melted material. These entrained particles as not precipitating on the end walls 12, 13, may condense in the trough 50 to pass off therefrom for collection in the receiver 52. The more volatile or truly gaseous material may rise through the opening 53, pass the open damper 55, and as subjected to various temperature drops in the zig zag passages are classified as condensate accumulations in the various condensate pipes 69.

The temperature for this mode of operation may be determined according to the wood and its size and there is flexibility for governing by the temperature control as checked from the pyrometers and governed by furnace operation and draft. The regulator valve 26 may also be adjusted for a desired water jacket bottom temperature. The water jackets in the zig zag passage also gives a control varied by the rate of condensation. A draft promotion may be accomplished by supply through jets in the pipes 48 as by water or steam, or there may be air intake for draft control. In this latter regard, care must be exercised in order that burning or combustion does not occur in the chamber 5. This air supply may be taken in by the adjusted opening for the lids 29.

In the event it is desired to run the wood for tar instead of operating for rosin, the damper 55 may be closed.

Above the troughs 27 and adjacent the trough sides 7, 8, 10, openings 72 in the end wall 12 from this lower portion of the chamber 5 extend to manifold 73 having upwardly therefrom pipes 74 in which damper 75 may be opened to allow flow through these pipes 74 into the passage 57 for the more volatile portions which have not condensed for take off at the spouts 27 with the tar.

Cleaning access may be obtained to the manifold 73 at door 76. Cleaning access is obtainable to the chamber 19 by door 77. After the chamber 5 has had its run and the products melted or volatilized from the wood treated have been taken off above and below, the run of this hot chamber may be discontinued, the door 14 opened, and the residue as char or charcoal may be removed, placed upon conveyor 78, and conducted to place for storage or packing for shipment. Thereafter, the raw material or wood supply from the elevator 1 may be placed into this chamber 5 for a repetition of the cycle of operations.

In the range of temperature control especially if the wood be not green, it may be desirable to moisten the wood as charged to the conveyor. Accordingly opening valve 79 may permit spray pipe 80 to discharge water upon the elevator 1 as delivering wood to this retort or kiln. Further control may be had as to the enveloping atmosphere in the retort or kiln. The valve 46 may be say for steam supply by way of line 47. Valve 81 may permit water supply from line 82. Valve 83 may permit compressed air supply from line 84. These control valves may be operated selectively or in various combinations to fit the desired condition of treatment, or to meet certain conditions as found in the particular wood or its character. These are features of flexibility permitting nicety of control. Peculiar value arises in this regard for even determinations of the melting out for the gums from the different woods.

By choking or holding back the volatiles as a blanketing atmosphere, serving as a solvent for the higher melting point fractions, there results a lower melting point or a control melting point for these gums. According to the character of the woods, these gums or rosins, even as approaching attributes of shellac or glue, may be classified as products hereunder.

What is claimed and it is desired to secure by United States Letters Patent is:

1. An apparatus for the distillation of wood comprising a chamber having an offtake from the top of said chamber, upper and lower collection troughs in the chamber independent of said offtake and extending transversely of said chamber, a condensate duct from said offtake and a separate condensate duct from said upper trough, a condensate receiver and means connecting the receiver to each of said ducts.

2. An apparatus for the distillation of wood comprising a chamber having a multiple V shaped bottom, vapor offtake members from the top and from the lower part of said chamber, means for heating an intermediate portion of the chamber and a water jacket for the bottom of the chamber.

3. An apparatus for the distillation of wood comprising a chamber having an arch top, an offtake from said top, upper and lower collection trough means in the chamber independent of said offtake and extending transversely of said chamber, said chamber having oppositely inclined bottom portions extending to the lower trough means, a condensate duct from said offtake and a separate condensate duct from said upper trough means, a condensate receiver and means connecting the receiver to each of said ducts.

4. An apparatus for the distillation of wood comprising a chamber having a multiple V shaped bottom, vapor offtake means from the top and collection trough means from the lower part of said chamber, condensate receiving means from said trough means, means for heating an intermediate portion of the chamber and a fluid containing jacket for the bottom of the chamber.

In witness whereof I affix my signature.
JOHN C. SCHAFFER.